(12) United States Patent
Ishii

(10) Patent No.: US 10,080,333 B2
(45) Date of Patent: Sep. 25, 2018

(54) HYDROPONIC METHOD UTILIZING BENEFICIAL MICRO-ORGANISMS

(71) Applicant: Sassoh Industries Co., Ltd., Tokyo (JP)

(72) Inventor: Takaaki Ishii, Ehime (JP)

(73) Assignee: Sassoh Industries Co., Ltd., Tokyo (JP)

( * ) Notice: Subject to any disclaimer, the term of this patent is extended or adjusted under 35 U.S.C. 154(b) by 0 days.

(21) Appl. No.: 15/076,066

(22) Filed: Mar. 21, 2016

(65) Prior Publication Data

US 2016/0198655 A1 Jul. 14, 2016

Related U.S. Application Data

(63) Continuation of application No. PCT/JP2014/074898, filed on Sep. 19, 2014.

(30) Foreign Application Priority Data

Sep. 19, 2013 (JP) ................................ 2013-194309
Mar. 25, 2014 (JP) ................................ 2014-062680

(51) Int. Cl.
*A01G 31/00* (2018.01)
*A01G 31/02* (2006.01)
*A01G 7/00* (2006.01)
*C05F 9/04* (2006.01)
*A01G 22/00* (2018.01)

(52) U.S. Cl.
CPC .............. *A01G 31/02* (2013.01); *A01G 7/00* (2013.01); *A01G 22/00* (2018.02); *A01G 31/00* (2013.01); *C05F 9/04* (2013.01)

(58) Field of Classification Search
CPC ........ A01G 1/001; A01G 31/00; A01G 22/00; A01G 31/02
See application file for complete search history.

(56) References Cited

U.S. PATENT DOCUMENTS

| | | | |
|---|---|---|---|
| 4,294,037 A | 10/1981 | Mosse et al. | |
| 4,589,226 A | 5/1986 | Stensaas | |
| 6,631,585 B1 | 10/2003 | Williams, Jr. | |
| 2004/0139652 A1* | 7/2004 | Blanco | A01G 1/00 47/58.1 R |
| 2005/0102900 A1* | 5/2005 | Valiquette | A01G 7/06 47/79 |
| 2009/0305895 A1 | 12/2009 | McIver et al. | |
| 2010/0307396 A1* | 12/2010 | Duzan, Jr. | A01G 23/00 111/100 |

FOREIGN PATENT DOCUMENTS

| | | |
|---|---|---|
| EP | 0015103 A1 | 9/1980 |
| JP | S55-118390 A | 9/1980 |
| JP | H05-153863 A | 6/1993 |
| JP | 2005-095135 A | 4/2005 |
| JP | 2010-279269 A | 12/2010 |
| WO | 2012101528 A2 | 8/2012 |

OTHER PUBLICATIONS

Extended European Search Report issued in corresponding European Application No. 14846332.6 dated Jan. 20, 2017 (9 pages).
International Search Report issued in corresponding International Application No. PCT/JP2014/074898 dated Dec. 22, 2014 (2 pages).
Notification of Transmittal of Translation of the International Preliminary Report on Patentability for Application No. PCT/JP2014/074898 dated Mar. 24, 2016 (9 pages).
Miwa et al., "Use of bahiagrass on hydroponic culture of lettuce", Horticultural Research (Japan), Mar. 28, 2008, vol. 7, separate vol. 1, p. 345 (1 page).
Takaaki Ishii, "Dojo sekai no Kyosei Katsudo 3 Arbuscular Mycorrhizal Fungi to sono Partner Saikin no Katsuyo Gijutsu (2)", Takii Saizensen autumn issue, 2011, 2011 Nen autumn issue, pp. 55-57 (3 pages).
Andre Freire Cruz et al., "Bacteria isolated from the spores of an arbuscular mycorrhizal fungus, Gigaspora margarita, stimulate its hyphal growth, and have the abilities of P solubilization and nitrogen fixation", Horticultural Research, vol. 9 (Suppl. 1), p. 265 (2010), the Japanese Society for Horticultural Science. (1 page).
Takaaki Ishii, "Soil management with partner plants which propagate arbuscular mycorrhizal fungi and their endobacteria", IFO Research Communications, vol. 26, pp. 87-100 (2012), Institute for Fermentation. (14 pages).
Takaaki Ishii, Symbiosis in the soil world (2): Techniques for making use of arbuscular mycorrhizal fungi and their bacterial partners (1), Takii Forefront, Summer edition, 2011, pp. 57-59 (4 pages).
Dore, Jeremy, "Green Manures—The Good, the Bad and the Ugly," retrieved from Internet at <URL:https://www.growveg.com.au/guides/green-manures-the-good-the-bad-and-the-ugly/>. Retrieved on Jul. 4, 2018, published on Aug. 29, 2008 (5 pages).
Examination Report issued in Australian application No. 2018201956; dated Jul. 4, 2018 (7 pages).

* cited by examiner

*Primary Examiner* — Kristen C Hayes
(74) *Attorney, Agent, or Firm* — Osha Liang LLP

(57) ABSTRACT

A method for hydroponic cultivation of crops by using mycorrhizal fungi and their partner bacteria includes growing a partner plant between rows of the crops, and inoculating a mycorrhizal fungal strain and a partner bacterial strain to infect the partner plant or the crop with the mycorrhizal fungal strain, wherein the partner bacterial strain is compatible and coexists with the mycorrhizal fungal strain, and the partner plant facilitates growth of the mycorrhizal fungal strain and the partner bacterial strain.

2 Claims, 11 Drawing Sheets

FIG. 1

| TREATMENT | CROP | MYCORRHIZAL INFECTION RATE (%) | FULL FRESH WEIGHT (g) | FRESH ROOT WEIGHT (g) |
|---|---|---|---|---|
| CONTROL | Mi | 0 | 199.9 ± 7.7 | 59.5 ± 2.9 |
| | Sa | 0 | 69.2 ± 5.6 | 10.5 ± 0.8 |
| | Ru | 0 | 19.4 ± 2.7 | 3.7 ± 0.5 |
| | Rm | 0 | 129.1 ± 14.0 | 17.7 ± 2.2 |
| | Rk | 0 | 182.5 ± 42.7 | 17.8 ± 4.1 |
| | Ti | 0 | 308.6 ± 39.9 | 21.3 ± 3.2 |
| | Ko | 0 | 140.3 ± 11.1 | 14.7 ± 2.3 |
| | Pi | 0 | 203.8 ± 15.4 | 34.0 ± 1.6 |
| AMF+PB+PP | Mi | 8.0 ± 0.7 | 277.9 ± 15.6 | 78.3 ± 6.0 |
| | Sa | 5.0 ± 0.3 | 105.6 ± 5.5 | 15.5 ± 0.7 |
| | Ru | 2.5 ± 0.5 | 129.3 ± 10.5 | 19.0 ± 3.5 |
| | Rm | 1.9 ± 0.6 | 208.7 ± 27.4 | 21.3 ± 5.4 |
| | Rk | 1.8 ± 0.3 | 328.6 ± 28.5 | 27.8 ± 2.4 |
| | Ti | 3.4 ± 0.1 | 382.6 ± 40.2 | 22.9 ± 2.4 |
| | Ko | 1.5 ± 0.6 | 365.9 ± 51.8 | 18.9 ± 4.7 |
| | Pi | 2.4 ± 0.6 | 352.4 ± 44.6 | 32.2 ± 3.6 |

FIG. 9

| TREATMENT | SUGAR CONTENT (Brix) | ACIDITY (%) | SUGAR/ACID RATIO |
|---|---|---|---|
| CONTROL | 7.9 ± 0.3 | 0.9 ± 0.0 | 8.8 ± 0.3 |
| AMF+PB+PP | 9.4 ± 0.1 | 0.5 ± 0.0 | 18.8 ± 1.3 |

FIG. 10

| TREATMENT | EC (mS/cm) | FULL FRESH WEIGHT (g) | FRESH ROOT WEIGHT (g) |
|---|---|---|---|
| CHEMICAL FERTILIZER (CONV. CONC.) | 1.2 | 88.8 ± 11.4 | 15.4 ± 0.9 |
| CHEMICAL FERTILIZER (1/2 CONC.) | 0.6 | 17.3 ± 2.7 | 3.7 ± 0.6 |
| GREEN MANURE (CONV. CONC.) | 1.2 | 46.2 ± 2.4 | 14.9 ± 1.1 |
| GREEN MANURE (1/2 CONC.) | 0.6 | 43.3 ± 2.7 | 14.4 ± 0.5 |

CONTROL   AMF+PB+PP+OLF

FIG. 12

| TREATMENT | CROP | MYCORRHIZAL INFECTION RATE (%) | FULL FRESH WEIGHT (g) | FRESH ROOT WEIGHT (g) |
|---|---|---|---|---|
| CONTROL (CONVENTIONAL) | GARLAND CHRYSANTHEMUM | 0 | 25.8 ± 2.4 | 7.3 ± 0.6 |
| | GREEN ONION | 0 | 1.4 ± 0.1 | 0.3 ± 0.1 |
| AMF+PB+PP+OLF | GARLAND CHRYSANTHEMUM | 5.6 ± 0.1 Y | 143.1 ± 12.7 **X | 34.6 ± 4.0 ** |
| | GREEN ONION | 3.6 ± 0.2 | 11.4 ± 0.4 ** | 2.5 ± 0.1 ** |

Z:AS THE ORGANIC LIQUID FERTILIZER (OLF,GREEN MANURE), COMMON VETCH WAS USED AFTER FERMENTING IT WITH PB COMPOSED PRIMARILY OF <u>BACILLUS SUBTILIS.</u>
Y:MEAN ± STANDARD ERROR (N = 5)
X:ANOVA(**:1% LEVEL)

HYDROPONIC METHOD UTILIZING BENEFICIAL MICRO-ORGANISMS

TECHNICAL FIELD

The present invention relates to a hydroponic cultivation method using, for example, a mycorrhizal fungus and its partner bacteria.

BACKGROUND ART

A mycorrhizal fungus is a soil symbiotic micro-organism that infects to roots of a plant, obtains photosynthetic products from the plant, and in return for this, contributes to the supply of nourishing water and the impartation of environmental stress tolerance and disease and pest resistance to the plant. Among mycorrhizal fungi, especially arbuscular mycorrhizal fungi (AMF) can create a symbiotic relationship with practically all terrestrial plants. By developing effective use methods of these fungi with their functions and roles in mind, these fungi can, hence, reduce the use amounts of chemical fertilizers and chemically-synthesized agrochemicals or can make them no longer needed. They are, accordingly, expected to enable an increase in the production of safe, secure and sustainable foods.

It has recently come clear that partner bacteria, which grow in and around spores of AMF, promote the hyphal growth of AMF and have phosphate solubilizing ability, nitrogen fixing ability and antagonistic action against plant pathogens (see, for example, Non-patent Documents 1 and 2).

As a result of a study on the introduction of bahiagrass, one of partner plants in the hydroponic cultivation of salad lettuce, and AMF, it has been found that the introduction of bahiagrass gives no adverse effect on the growth of salad lettuce or tends to slightly retard its growth and that the use of AMF reduces nutrient competition between salad lettuce and bahiagrass when such nutrient competition tends to take place under stress such low temperatures (see, for example, Non-patent Document 3).

NON-PATENT DOCUMENTS

Non-patent Document 1: Andre Freire Cruz, and four coauthors, "Bacteria isolated from spores of an arbuscular mycorrhizal fungus, *Gigaspora margarita*, promotes hyphal growth of the arbuscular mycorrhizal fungus, and has phosphate solubilizing ability and nitrogen fixing ability", Horticultural Research, Vol. 9 (Suppl. 1), 265 (2010), the Japanese Society for Horticultural Science.

Non-patent Document 2: ISHII, Takaaki, "Study on soil management by using an arbuscular mycorrhizal fungus and a micro-organism associated with the fungus and a partner plant", IFO Research Communications, Vol. 26, 87-100 (2012), Institute for Fermentation.

Non-patent Document 3: MIWA, Yuka, and two co-authors, "Use of bahiagrass in hydroponic cultivation of salad lettuce", Horticultural Research, Vol. 7 (Suppl. 1), 345 (2008), the Japanese Society for Horticultural Science.

SUMMARY OF THE INVENTION

However, absolutely no report has been made to date about a systematic hydroponic cultivation technology that uses AMF and their (AMF are pl.) partner bacteria along with a partner plant which assists proliferation of these beneficial micro-organisms. There is no research report either on a study about the effects of use of AMF and their partner bacteria along with their partner plant under hydroponic cultivation on crop production and crop quality, for example, such as fruit quality.

One or more embodiments of the present invention provide a hydroponic cultivation method that uses AMF and their partner bacteria along with their partner plant to give favorable effects on the yield and quality of a crop.

One or more embodiments of the present invention provide a method for hydroponic cultivation of crops by using mycorrhizal fungi and their partner bacteria, the method comprising: growing a partner plant between rows of the crops, and inoculating a mycorrhizal fungal strain and a partner bacterial strain to infect the partner plant or the crop with the mycorrhizal fungal strain, wherein the partner bacterial strain is compatible and coexists with the mycorrhizal fungal strain, and the partner plant facilitates growth of the mycorrhizal fungal strain and the partner bacterial strain.

According to one or more embodiments of the present invention, the mycorrhizal fungal strain is an arbuscular mycorrhizal fungal strain, wherein the partner plant or the crop is infected with the arbuscular mycorrhizal fungal strain in advance before commencement of the hydroponic cultivation of crops.

According to one or more embodiments of the present invention, the partner bacterial strain grows in or around spores of the mycorrhizal fungal strain, promotes hyphal growth of the mycorrhizal fungal strain, and has phosphate solubilizing ability, nitrogen fixing ability, and antagonistic action against plant pathogens.

According to one or more embodiments of the present invention, the partner plant promotes development of hyphal networks of the mycorrhizal fungal strain, facilitates growth of the partner bacterial strain around roots of the partner plant to assist proliferation of the partner bacterial strain, and does not give an adverse effect on growth of the crop.

The method according to one or more embodiments of the present invention further comprises using a hydroponic cultivation apparatus, wherein the hydroponic cultivation apparatus comprises a nutrient liquid recycling system and controls a temperature of water, and wherein the nutrient liquid recycling system facilitates proliferation of the mycorrhizal fungal strain and the partner bacterial strain and removes plant growth inhibiting substances leached from roots of the crop.

The method according to one or more embodiments of the present invention further comprises using an organic liquid fertilizer, wherein the organic liquid fertilizer comprises organic matter that is biodegraded beforehand with the partner bacterial strain.

According to one or more embodiments of the present invention, the partner bacterial strain is a *Bacillus* strain, *Paenibacillus* strain or a *Pseudomonas* strain.

According to one or more embodiments of the present invention, the partner plant is a mycorrhizal plant.

According to one or more embodiments of the present invention, the hydroponic cultivation apparatus is filled with zeolite or charcoal.

According to one or more embodiments of the present invention, the organic matter is an organic liquid fertilizer from green manure.

According to one or more embodiments of the present invention, the organic liquid fertilizer is obtained by biodegrading organic matter comprising stems and leaves of a leguminous plant, or stems and leaves of a gramineous plant.

Advantageous Effects of the Invention

According to one or more embodiments of the present invention, the method for the hydroponic cultivation of a crop uses a mycorrhizal fungus and its partner bacteria, and allows a partner plant, which enables easy growth of the mycorrhizal fungus and partner bacteria, to grow between rows of the crop, whereby the crop can be assisted in growth, increased in yield and improved in quality and can also be imparted with disease and pest resistance and environmental stress tolerance.

BRIEF DESCRIPTION OF THE DRAWINGS

FIG. 1 is a table showing the effects of arbuscular mycorrhizal fungi and their partner bacteria, and their partner plants on the growth of crops under a hydroponic cultivation method according to Example 1 of the present invention. In the table, the control plot used a conventional hydroponic cultivation method, while the arbuscular mycorrhizal fungus (AMF)+partner bacteria (PB)+partner plant (PP) plot used the hydroponic cultivation method according to one or more embodiments of the present invention.

FIG. 9 is a table showing, as an example of Example 2, the effects (about two months after transplantation) of the arbuscular mycorrhizal fungus (AMF)+partner bacteria (PB)+partner plant (PP) plot on the fruit quality of tomato under the hydroponic cultivation method according to one or more embodiments of the present invention. In the table, the control plot used the conventional hydroponic cultivation method, while the AMF+PB+PP plot used the hydroponic cultivation method according to one or more embodiments of the present invention.

FIG. 10 is a table showing the effects of green manure and chemical fertilizers on the growth of salad lettuce, which had been treated with the arbuscular mycorrhizal fungus (AMF)+partner bacteria (PB)+partner plant (PP) under a hydroponic cultivation method according to Example 3 of the present invention. In the table, a conventional concentration plot (chemical fertilizer plot (conv. conc.)), which used chemical fertilizers (conventional hydroponic cultivation method), is compared with a half-concentration plot (chemical fertilizer plot (½ conc.)), and a green manure plot (conv. conc.)), which was set to have an electrical conductivity (EC) similar to the conventional concentration plot, is compared in the growth of salad lettuce with a half-concentration plot (green manure plot (½ conc.)).

FIG. 12 is a table showing the effects given by hydroponic cultivation with an organic liquid fertilizer, which used the arbuscular mycorrhizal fungus (AMF)+partner bacteria (PB)+partner plant (PP), on the mycorrhizal infection rates and growth of Garland chrysanthemum and green onion in the hydroponic cultivation method according to Example 4 of the present invention.

DETAILED DESCRIPTION OF EMBODIMENTS

Figure 2:
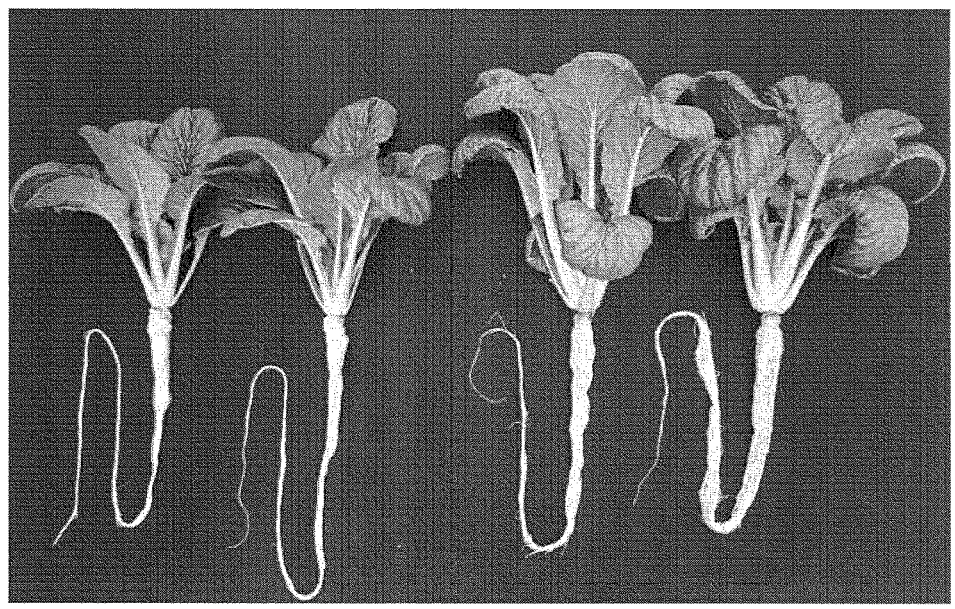
FIG. 2 is a photo showing, as an example of Example 1, the effects (one month after transplantation) of the arbuscular mycorrhizal fungus (AMF)+partner bacteria (PB)+the partner plant (PP) plot on the growth of pinogreen under the hydroponic cultivation method according to one or more embodiments of the present invention. In the photo, the two plants on the left side were raised by the conventional hydroponic cultivation method, while the two plants on the right side were in the AMP+PB+PP plot.

A hydroponic cultivation method according to one or more embodiments of the present invention is a cultivation method, which uses beneficial micro-organisms such as mycorrhizal fungi and their partner bacteria. Further, it uses an (intercropping) method that allows an intercropping plant (partner plant), which enables easy growth of the mycorrhizal fungi and their partner bacteria, to grow between rows of a crop. By using such a method of use and a hydroponic cultivation apparatus capable of creating an environment under which the beneficial micro-organisms are easy to grow, the yield and quality of the crop can be increased, thereby making it possible to avoid using chemical fertilizers or chemically-synthesized agrochemicals or to reduce their use amounts.

The mycorrhizal fungi may specifically be arbuscular mycorrhizal fungi (AMF) that creates a symbiotic relationship with substantially all plants, so that upon seeding or planting cuttings before the commencement of hydroponic cultivation, treatment is conducted with an inoculum with mycorrhizal spores contained therein to infect the crop and intercropping plant with the inoculum beforehand. One to two weeks after the inoculation that mycorrhizal formation was observed, seedlings of the crop are wrapped with sponge, and are embedded and transplanted in holes of a polystyrene foam for a hydroponic cultivation apparatus. The polystyrene foam is set in the hydroponic cultivation apparatus at the height of a liquid level, followed by the commencement of cultivation.

The partner bacteria (PB) is a bacteria harmless to humans and animals, such as a *Bacillus* strain, *Paenibacillus* strain or *Pseudomonas* strain, grows in and around spores of arbuscular mycorrhizal fungi, promotes hyphal growth of the mycorrhizal fungi, and has phosphate solubilizing ability, nitrogen fixing ability, and antagonistic action against plant pathogens.

The partner plant (PP) is a mycorrhizal plant such as bahiagrass, promotes development of hyphal networks of the mycorrhizal fungi, enables easy growth of the partner bacteria around roots of the partner plant to assist proliferation of the partner bacteria, and does not give an adverse effect on the growth or the like of the crop.

The hydroponic cultivation apparatus is configured to enable controlling the temperature of water at around 20 to 25° C., and may be of the nutrient liquid recycling system, which enables easy proliferation of the mycorrhizal fungi and their partner bacteria and is filled with zeolite, charcoal or the like that can remove plant growth inhibiting substances leached from the roots to permit creating an environment that does not give an adverse effect on the growth or the like of the plant.

As fertilizers for use in hydroponic cultivation, organic matter allowed to biodegrade beforehand with the partner bacteria, a lactic acid bacteria, a yeast or the like, for example, an organic liquid fertilizer from green manure may be used instead of chemical fertilizers. In particular, a fermentation liquor from green manure may be used as the organic matter, which is organic matter free of harmful materials and has been obtained by biodegradation of stems and leaves of a leguminous plant, such as vetch, Chinese milk vetch, clover or soybean, optionally with stems, leaves and the like of a gramineous plant added thereto.

As described above, one or more embodiments of the present invention can create an environment, under which the mycorrhizal fungi and their partner bacteria are easy to grow, by planting, between the rows of the crop, the partner plant that enables easy growth of the beneficial micro-organisms. At the same time, the use of a hydroponic cultivation apparatus, which can create an environment enabling easy growth of the beneficial micro-organisms, can stimulate the growth of the crop if the use amounts of chemical fertilizers and chemically-synthesized agrochemicals are significantly reduced or even if they are not used and are made unnecessary.

Accordingly, under hydroponic cultivation, the use of the mycorrhizal fungi and their partner bacteria also makes it possible to assist the growth of the crop, to increase its yield, to improve its quality, and further can impart disease and pest resistance and environmental stress tolerance.

Especially for *Cruciferous* crops which are generally considered to be hardly infected with a mycorrhizal fungus, the mycorrhizal fungus infects to their roots to some extent and stimulates their growth. Therefore, the mycorrhizal fungus can increase their yields and can improve their quality, and can also impart disease and pest resistance and environmental stress tolerance to them. In addition, the advance infection of a crop and a partner plant with the mycorrhizal fungus before the commencement of hydroponic cultivation can more efficiently achieve the growth promotion, yield increase and quality improvement of the crop and can impart higher disease and pest resistance and environmental stress resistance.

On the other hand, the partner bacteria—which promotes the hyphal growth of the mycorrhizal fungus, has phosphate solubilizing ability, nitrogen fixing ability and antagonistic action against plant pathogens, and is compatible—grows abundantly on and around the surfaces of roots of the crop and partner plant, and therefore, can assist the nutrient uptake of the crop and can impart soundness or the like to its roots.

Further, the use of the hydroponic cultivation apparatus, which is filled with zeolite, charcoal or the like capable of removing plant growth inhibiting substances leached from roots, is of the nutrient liquid recycling system and enables to control the temperature of water, and can create an environment that can make easier the proliferation of the mycorrhizal fungus and its partner bacteria and does not give an adverse effect on the growth or the like of the crop and partner plant.

Furthermore, the use of organic matter biodegraded beforehand with the partner bacteria or the like, for example, an organic liquid fertilizer (OLF) from green manure instead of chemical fertilizers enables completely organic cultivation under hydroponic cultivation, and therefore can increase the production of safe and secure crops.

Example 1

<Growth of Vegetables in One or More Embodiments of the Present Invention>

As Example 1 of the above-described hydroponic cultivation method, a description will next be made about an experimental example that used 8 kinds of vegetables.

Cuttings of apple mint (Mi) were planted in a nursing bed filled with vermiculite, and salad lettuce (Sa), arugula (Ru), red mustard (Rm), red *Brassica juncea* (Rk), bok-choy (Ti) "Butei", Japanese mustard spinach (Ko) "Zao" and pinogreen (Pi) were seeded in vermiculite. Shortly after that, an AMF (*Glomus clarum* (IK97)) inoculum (approx. 900 spores) with a coexisting partner bacteria (*Pseudomonas* sp. (KCIG001) NBRC109613) was inoculated. In addition, non-inoculated ones were also provided as the control.

After they were reared for about 2 weeks, using two recycling hydroponic cultivation apparatuses ("AQUA VITTON", manufactured by SASSOH KOGYO CO., LTD.), a nutrient solution (2.8 m$^3$ in tap water) with "OAT House 1" (700 g) and "OAT House 2" (465 g) contained therein was prepared in each of the two apparatuses. The seedlings in both the plots were transplanted to the apparatuses, respectively. Specifically in the plot inoculated with AMF, bahiagrass which had been inoculated beforehand with AMF was also transplanted as many as two seedlings per panel (89.5 cm×54.8 cm×4.3 cm) for every crop. The water temperature was set at 25° C. in each plot.

One month after the transplantation, the test crops were harvested, and their full fresh weights and fresh root weights were measured. Tip portions of their roots were also collected at the same time, and were used for the measurement of their mycorrhizal infection rates and the observation of the partner bacteria under UV exposure.

The nutrient solutions in both the plots were collected, and were observed for bacteria colonies on an agar medium (product of Nissui Pharmaceutical Co., Ltd.). Culture conditions were set at 25° C. under dark conditions. One day after the culture, each Petri dish was observed for colonies under UV exposure.

As a result, with respect to each test vegetable, its growth was better in the AMF+PB+PP plot compared with the control. In particular, as shown in FIG. 1, the full fresh weight and fresh root weight increased significantly in Mi, Sa and Ru, and the full fresh weight increased significantly in Ko, Pi, Rm and Rk. The values in FIG. 1 each indicate the mean±standard error (n=6 for Ru and Sa, n=4 for the rest). Further, the growth conditions of Pi are shown in FIG. 2.

Figure 3:
FIG. 3 is a photo showing one example of a use method of bahiagrass (a partner plant), which had been infected with the arbuscular mycorrhizal fungus and is indicated by an arrow, under the hydroponic cultivation method of Example 1.
Figure 4:
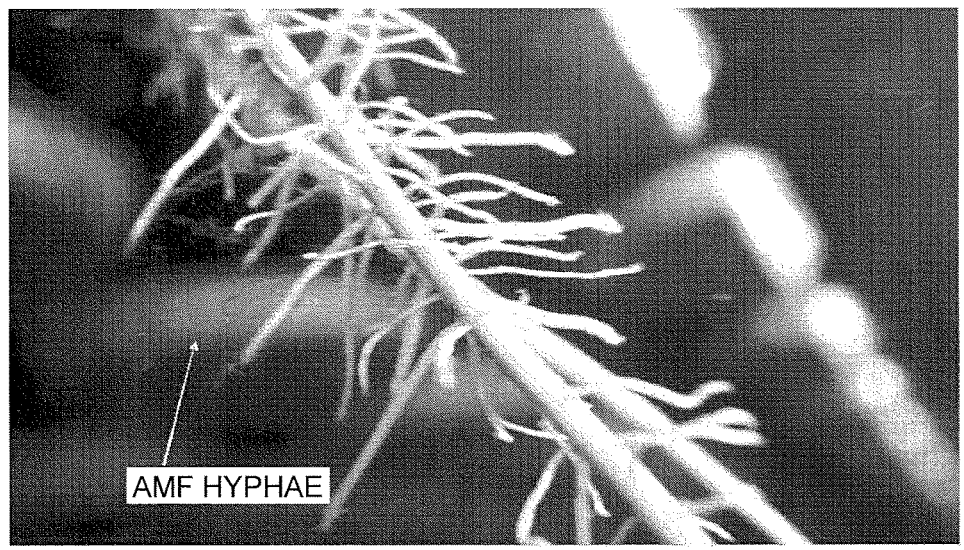
FIG. 4 is a photo showing hyphae of the arbuscular mycorrhizal fungus (AMF) grown entangling roots of bahiagrass (a partner plant) under the hydroponic cultivation method of Example 1.

In the AMF+PB+PP plot, bahiagrass, a partner plant, was also planted between rows of each vegetable as shown in FIG. 3. AMF infected on and around roots of bahiagrass had hyphae grown vigorously in the nutrient solution as shown in FIG. 4.

Figure 5:
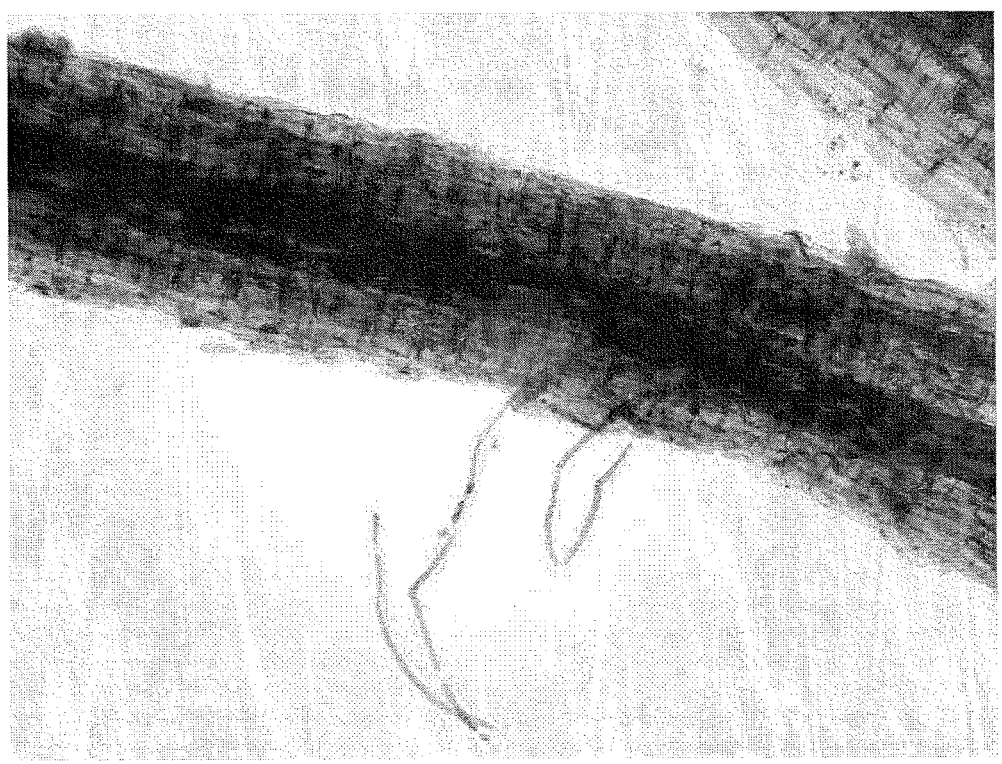
FIG. 5 is a microphoto showing, as another example of Example 1, mycorrhiza (×100, one month after the commencement of hydroponic cultivation) of pinogreen in the arbuscular mycorrhizal fungus (AMF)+partner bacteria (PB)+partner plant (PP) plot under the hydroponic cultivation method according to one or more embodiments of the present invention.

In the AMF+PB+PP plot, mycorrhiza were formed on roots of each vegetable as shown in FIG. 1. FIG. 5 shows mycorrhiza on Pi.

Figure 6A:
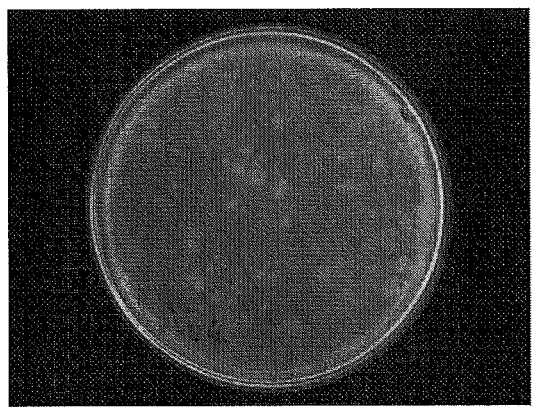
FIG. 6(A) and FIG. 6(B) show microphotos of the partner bacteria in a culture medium in the arbuscular mycorrhizal fungus (AMF)+partner bacteria (PB)+partner plant (PP) plot under the hydroponic cultivation method of Example 1 as observed under UV exposure one day after the culture.
Figure 6B:
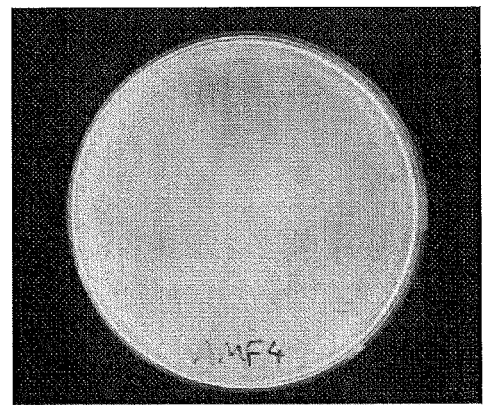
Figure 7:
FIG. 7 shows microphotos of the growth conditions of the partner bacteria on and around pinogreen roots in the arbuscular mycorrhizal fungus (AMF)+partner bacteria (PB)+partner plant (PP) plot under the hydroponic cultivation method according to one or more embodiments of the present invention as observed under UV exposure one month after the commencement of the cultivation.

In the nutrient solution of the AMF+PB+PP plot, the partner bacteria abundantly proliferated as shown in FIG. 6(A) and FIG. 6(B), and attached to roots and grew there in a large number as shown in FIG. 7. Described specifically, as shown in FIG. 6(A), FIG. 6(B) and FIG. 7, the conventional hydroponic cultivation method (the control plot) on the left side presented no fluorescence around roots under UV exposure, while the AMF+PB+PP plot on the right side presented fluorescence around roots under UV exposure and was observed brightly.

As a result of these, it has become evident that the use of AMF and their partner bacteria assists the growth of a crop even under hydroponic cultivation and significantly contributes to an increase in yield. In particular, the growth became vigorous even in the *Cruciferous* crops to which AMF is generally considered to hardly infect. As a cause of this, it is believed that AMF infects to roots of these crops to some extent, the partner bacteria grow in a great number around the roots, and AMF and the partner bacteria take significant part in the impartation of phosphate solubilizing ability, nitrogen fixing ability, root soundness, and the like.

Example 2

<Growth and Fruit Quality of Tomato in One or More Embodiments of the Present Invention>

As Example 2 of the above-described hydroponic cultivation method, a description will next be made about an experimental example that used tomato.

Shortly after seeding tomato in vermiculite, the AMF (*Glomus clarum* (IK97)) inoculum (approx. 900 spores) with the coexisting partner bacteria (*Pseudomonas* sp. (KCIGC01) NBRC109613) was inoculated in a similar manner as in Example 1. In addition, non-inoculated one was also provided as the control.

After they were reared for about 2 weeks, hydroponic cultivation was conducted in a similar manner as in Example 1.

About two weeks after the transplantation, tomato fruits were harvested, and the quality of the fruits, especially their sugars and acids were analyzed. The sugar content was measured by a sugar refractometer, and the acid content was measured by the titratable acidity method and was determined in terms of citric acid.

Figure 8:
FIG. 8 is a photo showing the effects (about one month after transplantation) of the arbuscular mycorrhizal fungus (AMF)+partner bacteria (PB)+partner plant (PP) plot on the growth of tomato under a hydroponic cultivation method according to Example 2 of the present invention. In the photo, the left side was raised by the conventional hydroponic cultivation method (is a control plot), while the right side is an AMP+PB+PP plot.

As a result, as shown in FIG. 8, the growth of tomato was extremely good in the AMF+PB+PP plot compared with the control. In FIG. 8, the left side indicates the conventional hydroponic cultivation method (control plot), and the right side indicates the AMF+PB+PP plot.

As shown in FIG. 9, the sugar content of a tomato juice in the AMF+PB+PP plot was substantially high compared with the control. As the acid content became lower, the sugar/acid ratio was significantly high. The values in FIG. 9 each indicate the mean±standard error (n=8).

Example 3

<Effects of Organic Liquid Fertilizer from Green Manure in One or More Embodiments of the Present Invention>

As Example 3 of the above-described hydroponic cultivation method, a description will next be made about an experimental example that used, instead of chemical fertilizers, an organic liquid fertilizer from green manure.

Shortly after seeding salad lettuce in vermiculite, the AMF (*Glomus clarum* (IK97)) inoculum (approx. 900 spores) with the coexisting partner bacteria (*Pseudomonas* sp. (KCIG001) NERC109613) was inoculated in a similar manner as in Example 1.

After they were reared for about two weeks, the following test plots were provided using the same chemical fertilizers as in Example 1: a conventional concentration plot (chemical fertilizer plot (conv. conc.)) with the concentrations of the chemical fertilizers also set as in Example 1; a half-concentration plot (chemical fertilizer plot (½ conc.)); a green manure plot (conv. conc.) with an electrical conductivity (EC) similar to the conventional concentration plot; and a half-concentration plot (green manure plot (½ conc.)). Seedlings of salad lettuce were transplanted to those test plots.

About three weeks after the transplantation, the plants of salad lettuce were sliced and examined, and their full fresh weights and fresh root weights were measured.

As a result, the growth of salad lettuce in the chemical fertilizer plot (conv. conc.), green manure plot (conv. conc.) and green manure plot (½ conc.) were good as shown in FIG. 10. In the chemical fertilizer plot (conv. conc.), the growth rates tended to be high, but were uneven and varied substantially. In the chemical fertilizer plot (½ conc.), the growth was extremely poor. In the green manure plot (conv. conc.) and green manure plot (½ conc.), however, salad lettuce was even in size, and the difference in growth rate between both the plots was small. The values in FIG. 10 each indicate the mean±standard error (n=8).

Example 4

<Effects on the Growth of Several Garden Crops in One or More Embodiments of the Present Invention>

Concerning effects of chemical liquid fertilizers and organic liquid fertilizers on the growth of several garden crops in hydroponic cultivation that used AMF, PB and PP, a description will next be made about experimental examples in each of which a comparison was made with the conventional hydroponic cultivation that did not use AMF, PB and PP.

Experiment 1

Shortly after seeding, in vermiculite, mini tomato "Stella" on April 22 and salad lettuce on June 1 of the same year, the AMF (*Glomus clarum* (IK97)) inoculum (approx. 900 spores) with the coexisting PB (*Pseudomonas* sp. (KCIG001) NBRC109613) was inoculated in a similar manner as in Example 1. In addition, non-inoculated ones were also provided as control (conventional) plots.

Using two recycling hydroponic cultivation apparatuses ("AQUA VITTON", manufactured by SASSOH KOGYO CO., LTD.), a chemical nutrient solution ("OAT House 1" (700 g) and "OAT House 2" (465 g) added to each water tank of 2.8 m³ capacity) was prepared. To those apparatuses, the AMF+PB-inoculated mini tomato seedlings and non-inoculated mini tomato seedlings were transplanted on May 16 of the same year, and the AMF+PB-inoculated salad lettuce seedlings and non-inoculated salad lettuce seedlings were transplanted on June 25 of the same year.

For the AMF+PB-inoculated seedlings, bahiagrass which had been inoculated beforehand with AMF was also transplanted as PP as many as two seedlings per panel (89.5 cm×54.8 cm×4.3 cm) for each crop. The water temperature in each plot was set at 25° C. in each plot.

Subsequently, salad lettuce was harvested on July 22 of the same year, and the full fresh weights and fresh root weights of the harvested plants of salad lettuce were measured. From July 29 of the same year, mini tomato was harvested sequentially, and the full fresh weights, fresh root weights, sugar contents and acidities of the harvested fruits of mini tomato were measured, respectively. Tip portions of roots of the test crops were also collected at the same time, and were used for the measurement of their mycorrhizal infection rates and the observation of PB under UV exposure.

As a result, it was found that in each of salad lettuce and mini tomato, the growth of the AMF+PB+PP plot was very vigorous compared with the control and the period of cultivation until the harvest was substantially shortened. In the case of mini tomato, the sugar content and sugar/acid ratio of a juice became higher significantly. In the AMF+PB+PP plot, mycorrhiza formation and PP were observed on and around roots of the test crop, and the differences in growth among the individual seedlings were extremely small. This indicates that hyphal networks of AMF also function under hydroponic cultivation and the distribution of nutrients is properly performed.

Experiment 2

Three 100-L tanks were provided with vetch (harvested on April 15 of the same year) placed as much as about 10 kg per tank. In each tank, a nutrient solution (about 1 L), which was independently developed by the present inventor and his colleagues and contained PB composed primarily of *Bacillus subtilis* (*Bacillus* strain) and *Pseudomonas* sp. (KCIG001) NBRC109613, was placed, followed by fermentation to prepare an organic liquid fertilizer (OLF, green manure). Green onion "Koharu" was seeded on August 29 of the same year, Garland chrysanthemum "Middle-sized Leaf Garland Chrysanthemum" was seeded on August 31 of the same year, and similar to Experiment 1, AMF+PB-inoculated seedlings and non-inoculated seedlings were provided. Subsequently, on September 13 of the same year, in a similar manner as in Experiment 1, two hydroponic cultivation apparatuses were provided, and the organic liquid fertilizer (OLF) was added to AMF+PB+PP to provide an organic liquid fertilizer (OLF) plot with the EC thereof set at 0.6 mS/cm. The seedlings inoculated with the beneficial microorganisms were transplanted (AMF+PB+PP+OLF plot).

As a control plot, on the other hand, a (conventional) hydroponic cultivation plot with only a chemical liquid fertilizer (EC: 1.2 mS/cm) contained therein without using AMF+PB+PP was provided. The water temperature in each plot was set at 20° C. in each plot.

Subsequently, green onion was harvested on October 31 of the same year, Garland chrysanthemum was harvested on October 24 of the same year, and the full fresh weights and fresh root weights of the harvested plants were measured. In a similar manner as in Experiment 1, the collected roots were examined for mycorrhizal formation and PB. Disease and insect control in Experiment 1 and Experiment 2 used citrus oil powder as a plant protectant.

Figure 11:
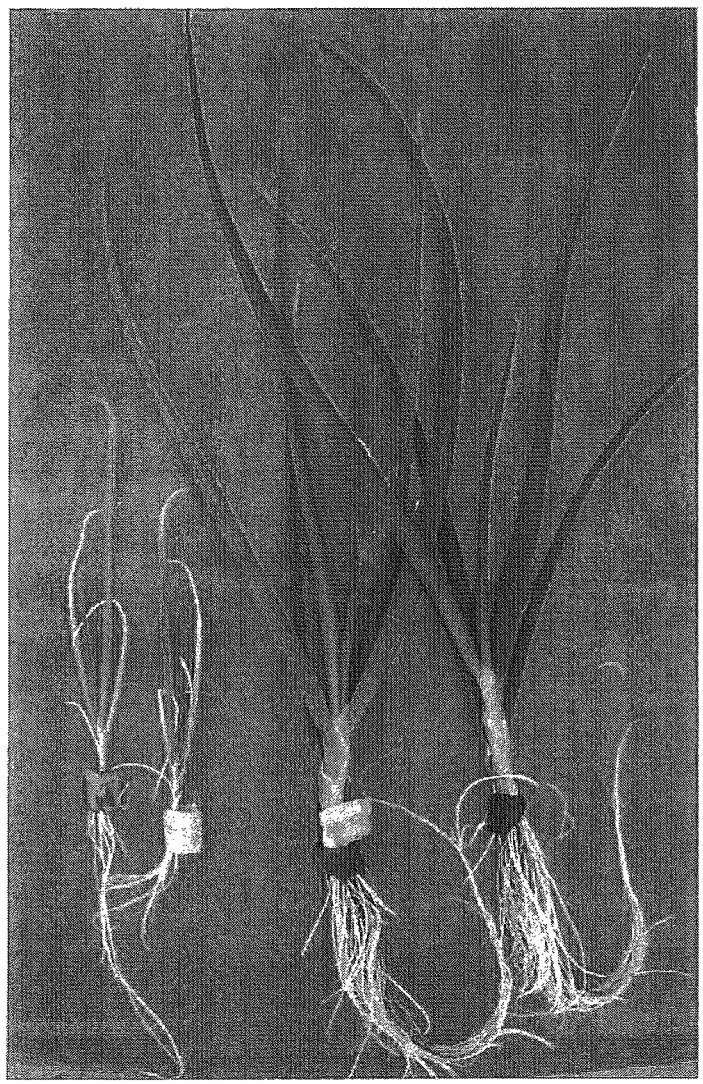
FIG. 11 is a photo showing the effects of hydroponic cultivation with an organic liquid fertilizer, which used the arbuscular mycorrhizal fungus (AMF)+partner bacteria (PB)+partner plant (PP), on the growth of green onion in a hydroponic cultivation method according to Example 4 of the present invention.

As a result, concerning each of green onion (see FIG. 11) and Garland chrysanthemum, in the AMF+PB+PP+OLF plot, the growth was very vigorous and the time of harvesting was accelerated, both compared with the control, even when the concentration of EC was ½ of that in the control. Similar to Experiment 1, in the AMF+PB+PP+OLF plot, mycorrhizal formation and PB were confirmed, the individual seedlings were even in size. It has, therefore, become evident that irrespective of a chemical liquid fertilizer or an organic liquid fertilizer, AMF+PB+PP makes the growth of a crop vigorous, accelerates its harvesting, and greatly contributes to an increase in its yield.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims."

What is claimed is:

1. A method for hydroponic cultivation of crops, the method comprising:
   inoculating a partner plant or the crops with a mycorrhizal fungal strain and a partner bacterial strain, the partner plant or the crops being infected with the mycorrhizal fungal strain, and
   hydroponically growing the partner plant and the crops, wherein
   the partner plant grows between the crops,
   the partner bacterial strain is compatible and coexists with the mycorrhizal fungal strain, and
   the partner plant facilitates growth of the mycorrhizal fungal strain and the partner bacterial strain.

2. The method according to claim 1,
   wherein the inoculating is performed prior to the hydroponically growing, and
   wherein the mycorrhizal fungal strain is an arbuscular mycorrhizal fungal strain.

* * * * *